United States Patent Office 2,839,488
Patented June 17, 1958

2,839,488
COMPOSITIONS CONTAINING EPOXY RESINS AND FURFURAL-KETONE REACTION PRODUCTS

Mortimer T. Harvey, South Orange, and Peter L. Rosamilia, Newark, N. J., assignors to Harvel Research Corporation, a corporation of New Jersey No Drawing. Application October 18, 1957
Serial No. 690,918

14 Claims. (Cl. 260—42)

This invention relates to novel compositions of matter and to methods for preparing them. More particularly, this invention is directed to novel combinations of Material A which is liquid at 300° F. and is selected from a group consisting of (a) furfural-ketone organic reaction products and (b) homopolymers of (a) together with Material B which is liquid at 300° F. and is selected from the group consisting of monomeric and polymeric glycidyl ethers of materials selected from the group consisting of polyhydric phenols and polyhydric alcohols; and also to novel products produced by substantially simultaneously or concurrently polymerizing and/or copolymerizing said materials A and B in said novel combinations and/or otherwise by chemical reaction curing or setting said novel combinations.

Said (a) furfural-ketone organic reaction products may be produced by reacting in the presence of an alkaline catalyst, furfural with one or a plurality of ketones and especially those having at least two hydrogen atoms on an alpha carbon; and said (b) may be produced by homopolymerizing (a) generally in the presence of an alkaline or acidic agent.

The materials B preferably employed in the practice of this invention are liquid at 300° F. and are monomeric and polymeric glycidyl polyethers of polyhydric phenols and/or polyhydric alcohols, with said glycidyl polyethers preferably having an epoxide equivalency greater than 1. The glycidyl polyethers of the polyhydric phenols are those of either mononuclear or polynuclear phenols.

Said glycidyl polyethers of the aliphatic polyhydric alcohols are obtainable by practicing the methods known to the art, an example of which is to react such alcohol with epichlorhydrin or glycerol dichlorhydrin in the presence of a suitable acidic catalyst, such as boron trifluoride and then converting said reaction product to the polyepoxide by employing suitable alkaline agents, such as sodium hydroxide, sodium aluminate, etc. Examples of some of said glycidyl polyethers are those of such alcohols as diethylene glycol, propylene glycol, glycerol, etc., and all of which have a 1,2-epoxide equivalency greater than 1.

The glycidyl polyethers of polyhydric phenols are obtainable by reacting a polyhydric phenol with epichlorhydrin in basic medium at about 50° C. to 150° C. with use of more than one mole of epichlorhydrin per equivalent of phenolic hydroxyl group of the phenol and a slight stoichiometric excess of base such as about 2% to 3% excess sodium or potassium hydroxide. The reaction is effected by heating for several hours and the product is then separated from formed salt, excess base, and any unreacted epichlorhydrin. It is usually preferred to employ glycidyl polyether of a dihydric phenol in the invention, which product, instead of being a single simple compound, is generally a complex mixture of glycidyl polyethers, but the principal product may be represented by the formula

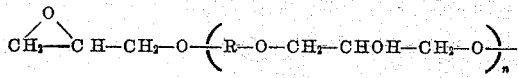

wherein $n$ is an integer of the series 0, 1, 2, 8 . . . , and R represents the divalent hydrocarbon radical of the dihydric phenol. While for any single molecule of the polyether $n$ is an integer, the fact that the obtained polyether is a mixture of compounds causes the determined value for $n$, e. g., from molecular weight measurement, to be an average which is not necessarily zero or a whole number. Although the polyether is a substance primarily of the above formula, it may contain some material with one or both of the terminal glycidyl radicals in hydrated form, and therefore, the 1,2-epoxy equivalency approaches, but it not equal to 2.0; it is a value between 1.0 and 2.0.

The simplest of the polyethers is the diglycidyl diether of a dihydric phenol. It contains a single divalent aromatic hydrocarbon radical from the dihydric phenol and has two glycidyl radicals linked thereto by ethereal oxygen atoms. More generally, the polyether of dihydric phenols is of more complex character and contains two or more aromatic hydrocarbon radicals alternating with glyceryl groups in a chain which are linked together by intervening ethereal oxygen atoms.

The 1,2-epoxy equivalency of the glycidyl polyether refers to the number of 1,2-epoxy groups

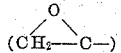

contained in the average molecule of the polyether. The 1,2-epoxy equivalency is thus dependent upon the molecular weight and the epoxide value which is measured as gram equivalents of epoxide per 100 grams of polyether. The 1,2-epoxide value is determined by heating a weighed sample of polyether with an excess of 0.2 N pyridinium chloride in chloroform solution at the boiling point under reflux for two hours whereby the pyridinium chloride hydrochlorinates the epoxy groups to chlorhydrin groups. After cooling, the excess unreacted pyridinium chloride is back-titrated with 0.1 N-sodium hydroxide in methanol to the phenolphthalein end point. The epoxide value is calculated by considering one HCl as equivalent to one epoxide group. This method is used for obtaining all epoxide values discussed herein.

Any of the various polyhydric phenols used in preparing the polyethers include mononuclear phenols such as resorcinol, catechol, hydroquinone, methyl resorcinol, etc.; or polynuclear phenols like 2,2-bis(4-hydroxyphenyl) propane which is termed bis-phenol A herein for convenience, 4,4-dihydroxybenzophenone, bis - (4 - hydroxyphenyl) - methane, 1,1 - bis(4 - hydroxyphenyl) ethane, 1,1-bis(4-hydroxyphenyl) isobutane, 2,2-bis(4-hydroxyphenyl) butane, 2,2-bis(4 - hydroxy - 2 - methylphenyl) propane, 2,2 - bis(4 - hydroxy - 2 - tertiary butylphenyl) propane, 2,2-bis(2-hydroxy naphthyl) pentane, 1,5-dihydroxynaphthalene, etc., as well as more complex polyhydric phenols such as pyrogallol, phloroglucinol, and novolac resins from condensation of a phenol with an aldehyde in the presence of an acidic condensation catalyst. Preparation of glycidyl polyether of novolac resin is described in Example 27 of German Patent No. 676,117.

Other examples of such glycidyl polyethers of bisphenols are those obtainable by reacting epichlorhydrin in a basic medium with the organic reaction products produced by reacting a material selected from the class consisting of hydroxy benzene, naphthol, anthranol and their homologues with a phenol having an unsaturated hydrocarbon substituent, with such reaction products being shown in the U. S. patent to M. T. Harvey, 2,317,607, issued April 27, 1943, and glycidyl polyether of certain of said reaction products being shown in U. S. patent to D. Wasserman, 2,665,266. Still other examples of said glycidyl polyethers of bis-phenols are those which may be derived from any of the other bis-phenols produced according to said Harvey patent. Such bis-phenols may be reacted with epichlorhydrin in the presence of an alkali employing the procedure set forth in the aforesaid Wasserman patent to produce the glycidyl polyethers of said other bis-phenols.

Examples of some of materials A suitable for use in the practice of this invention are set forth below; also the various furfural-ketone organic reaction products, as well as homopolymers thereof produced by the methods described in U. S. Patents 2,363,829, 2,461,510, 2,545,461 and 2,600,403 are examples of materials A suitable for use in the practice of this invention.

Heretofore and particularly as shown in said U. S. Patent 2,461,510 furfuraldehyde-ketone reaction products have been polymerized on the acid side and can be set, with the aid of heat, to the infusible and insoluble state. We have found that we can use alkaline amines to polymerize furfuraldehyde-ketone reaction products and to carry the resulting polymers over to the infusible and insoluble state. And this polymerization of the furfuraldehyde-ketone reaction product can be conducted as a copolymerization with other products (with the aid of alkaline amines), such as copolymerization with materials B.

It is an object of the present invention to improve or increase the impact strength of resins made from materials B. In accordance with the present invention, we mix one or a combination of two or more materials B with one or a combination of two or more materials A and subject the mixture to the contact influence of amines and obtain polymerization products. The resulting products have high tensible strength and have greater heat resistance, improved chemical resistance, particularly against alkaline materials, and higher impact strength than do products obtained without the use of material A therein.

Other objects of the present invention will appear from the above and from the following description of the invention and from the claims forming part of this application.

The following are illustrative general examples of the strongly alkaline amines suitable for the practice of the present invention: primary amines, poly primary amines, diamines and polydiamines, triamines, tetramines, and others which are equivalents of the more particular or specific examples given herein. Illustrative particular or specific examples of amines suitable for the practice of the present invention are methylamine, ethylene diamine, propyl diamine, diethylene triamine, tri(dimethylaminomethyl) phenol, triethylene tetramine, dimethylaminopropylamine, dimethyl aminomethyl phenol, diethyl aminopropylamine, benzyl dimethylamine piperidine, tri(dimethylaminomethyl) phenol tri(2-ethyl hexoate), diethyl amine, pyridine and dicyandiamide.

The following Examples 1–16 are set forth merely by way of illustrating methods which may be followed to produce starting materials of the present invention, all parts being given by weight unless otherwise specified.

*Example 1*

The following materials in the given proportions were used in making a furfural-ketone resin:

1800 parts furfuraldehyde
945 parts acetone
16 parts caustic soda
32 parts water
20.75 parts sulfuric acid
41.5 parts water A mixture of 16 parts of caustic soda and 32 parts of water is prepared and allowed to cool. In a separate container, a mixture of 20.75 parts of sulfuric acid and 41.5 parts of water is prepared. Into a Monel metal unit equipped with stirrer and having cold water on the jacket, a mixture of 200 parts furfural and 105 parts of acetone is weighed in. One-ninth of the caustic soda water solution is added and the mass is allowed to react. When the temperature stops rising, another prepared batch of 200 parts furfural and 105 parts of acetone is pumped into the unit and another one-ninth of the caustic soda-water solution is added whereupon the temperature rises. When the temperature stops rising, there is added thereto another prepared batch of 400 parts of furfural and 210 parts of acetone and subsequently two-ninths of the caustic soda-water solution. Thereafter a prepared batch of 500 parts of furfural and 262.5 parts of acetone is pumped into a unit and another two-ninths of the caustic soda-water solution is added, and then finally the remaining batch consisting of 500 parts of furfural and 262.5 parts of acetone is added and the remainder of the caustic soda-water solution. The entire mass is refluxed for 30 minutes at 190–195° F. Chilling is then started and the sulphuric acid solution is added to neutralize the mass which is then chilled to 125° F. and vacuum applied for dehydration. Heat is applied and vacuum continued until the temperature reaches 195° F. Thereupon the heat and vacuum are cut off, chilling started, samples taken and when cooled to 150° F. the mass is pumped to a storage tank. This product is a starting material known herein as material FK1.

*Example 2*

96 grams furfuraldehyde
58 grams acetone and
12½ cc. NaOH in 25 grams of water were mixed together whereupon an exothermic reaction occurred. After the exothermic reaction had subsided, the mass was heated to boiling and maintained in this state of boiling in a reflux condenser for approximately one hour. The mass was then neutralized with dilute sulfuric acid and was subsequently dehydrated under vacuum and is a starting material hereinafter known as material FK2.

In the Examples 3 to 16 below, generally, the steps described in Examples 1 and 2 were employed and the materials listed in the stated quantities were used.

*Example 3*

96 grams of furfural
72 grams of methyl ethyl ketone
4.4 cc. 33% solution of NaOH in water were used to produce material FK3.

*Example 4*

100 grams furfural
100 grams methyl isobutyl ketone
1 gram NaOH in 2 grams of water were used to produce material FK4.

*Example 5*

200 grams furfural
232 grams diacetone alcohol, and
1 gram NaOH in 1 gram water were used to produce material FK5.

*Example 6*

100 grams furfural
138 grams isophorone, and
5 grams NaOH in 10 grams of water were used to produce material FK6.

Example 7

96 grams of furfural
138 grams of phorone, and
1 gram NaOH in 2 grams of water were used to produce material FK7.

Example 8

96 grams of furfural
98 grams of cyclohexanone, and
1 gram NaOH in 2 grams of water were used to produce material FK8.

Example 9

96 grams of furfural
98 grams of mesityl oxide, and
1 gram of NaOH in 2 grams of water were used to produce material FK9.

Example 10

96 grams of furfural
120 grams acetophenone and
1 gram of NaOH in 2 grams of water were used to produce material FK10.

Example 11

96 grams of furfural
114 grams of methyl n-amyl ketone, and
1 gram of NaOH in 2 grams of water were used to produce material FK11.

Example 12

96 grams of furfural
114 grams acetonyl acetone (hexandione-2.5), and
1 gram of NaOH in 2 grams of water were used to produce material FK12.

Example 13

96 grams of furfural
28 grams of acetonyl acetone
1 gram of NaOH in 2 grams of water were used to produce material FK13.

Example 14

96 grams of furfural
14 grams acetonylacetone, and
1 gram of NaOH in 2 grams of water were used to produce material FK14.

Example 15

96 grams of furfural
86 grams diethyl ketone, and
1 gram of NaOH in 2 grams of water were used to produce material FK15.

Example 16

96 grams of furfural
140 grams diisobutyl ketone, and
20 grams of NaOH in 40 grams of water were used to produce material FK16.

Example 17

100 grams of material FK1 is mixed with 6 grams of a solution consisting of 2 parts of caustic soda dissolved in 4 grams of water. While being constantly stirred, this mixture is warmed whereupon an exothermic reaction takes place. The temperature of the mass is controlled so that it is maintained in the range of about 100–120° F. The reaction is allowed to continue under said conditions until the viscosity of a sample thereof when measured at 25° C. is ten times that of the original material FK1. At this stage there is added thereto a quantity of dilute sulfuric acid sufficient to neutralize said mass. Then the mass is substantially completely dehydrated under a high degree of vacuum to provide a product consisting essentially of homopolymerized FK1 hereinafter known as material FK17.

The foregoing general procedure set forth in Example 17 may be followed to homopolymerize under alkaline conditions, the furfural-ketone reaction products, such as the monofurfurylidene-ketone and difurfurylidene-ketone compounds, as for example monofurfurylidene-acetone and difurfurylidene acetone, as well as materials FK2 to FK16 herein disclosed.

ILLUSTRATIVE EXAMPLES OF METHODS FOR PREPARING CERTAIN GLYCIDYL ETHERS OF BIS-PHENOLS

Example A 860 grams of hydroxy benzene was charged into a reaction vessel. The hydroxy benzene was converted to the liquid state and maintained at a pot temperature of 80–85° C. Into said now liquid hydroxy benzene, there were added 35 grams of boron trifluoridehydroxy benzene complex (26% boron trifluoride). The mass was constantly stirred and while maintained within said temperature range, there was added thereto at a uniform rate over a one hour period, 215 grams of treated cashew nut shell liquid which had been previously prepared in accordance with the method set forth in the U. S. patent of Solomon Caplan, No. 2,559,594 issued on July 10, 1951. In the course of the cashew nut shell liquid addition over this one hour period, an exothermic reaction took place and by the use of an appropriate cooling means the temperature of the mass was maintained with said temperature range throughout the addition. Subsequently, external heat was applied to maintain the temperature of said mass within said temperature range for another hour. Then there was added thereto 7.5 grams of sodium hydroxide as a 26% aqueous solution to neutralize the boron trifluoride. Salts formed and were removed by filtering the mass through a bed of Celite (diatomaceous earth) on a Buchner funnel. The salt free mass was now heated under a vacuum up to a pot temperature of 150° C. at 20 mm. of mercury pressure, whereby all of the excess hydroxy benzene was removed. The mass was then measured and found to weigh 286 grams and upon analysis was found to contain a .91 equivalent of hydroxy benzene per mole of the cashew nut shell liquid. This reaction product which is an example of a starting material is hereinafter referred to as product I and is a thick viscous liquid.

180 grams of product I was dissolved in 180 grams of dioxane and placed in a 2-liter, 3-neck flask equipped with stirrer, thermometer and addition funnel. 41 grams of sodium hydroxide was dissolved in 80 grams of water and the solution was added to the solution in the flask resulting in a rise in temperature to 50–55° C. while the stirrer constantly agitated the mixture. While the stirrer is still rotating, the flask was heated to raise the temperature of the mass therein to approximately 85° C. and this condition is maintained by appropriate temperature-control device, as 85 grams of epichlorhydrin was added thereto dropwise over a period of ½ hour. After the last increment of epichlorhydrin was added, the temperature of the mass was then increased from 85° C. to approximately 90° C. and the mass was maintained at that temperature for 1½ hours. At the end of that period, a sample was tested for unreacted phenolic hydroxy groups by employing the Gibbs 2,6-dibromoquinoneimide chloride reagent, and this test indicated 11.4% unreacted phenol. The mass was then neutralized with .09 mole of hydrochloric acid as a 10% solution and a total of 2 liters of methyl isobutyl ketone added in parts and distilled off under a vacuum to remove the water. The solution of the reaction mass in the ketone remained over night to permit the salts to settle. This was then filtered through a bed of Celite (diatomaceous earth) filter aid on a Buchner funnel and the solvent removed in vacuo to a pot temperature of 90° C. at 20 mm. of mercury pressure. The reaction product, known as product IE, is a viscous, pourable resinous mass which was readily dissolved in toluene to make a 40% solution. This resinous product had an epoxy value which equalled .102 equivalent per 100 grams. Portions of said solution were spread in films on aluminum plates and tin-coated lids, and then these film containing bases were placed in an oven maintained at 340° F. After 5 to 6 hours in the oven, the resultant film was examined and found to have been converted to a tough, resinous film and after 17 hours in that oven said coatings were found to be infusible, tough, hard, brown-black films exhibiting remarkable adhesion to the bases.

Triethylene tetramine will harden the resinous reaction mass product IE at room temperatures when 2-5 parts thereof are added to 95 parts of product IE and this mixture is allowed to stand at room temperature for about 17 hours. A .5-1.0 mil film of said mixture on aluminum plates was allowed to stand for 72 hours at room temperature, and at the end of that period was a substantially tough film which resisted the solvent action of polyester hydraulic fluid when applied thereto for at least one week through cotton pads soaked therewith.

*Example B*

The procedure is the same as the one set forth in Example A for the preparation of product I, except that the amount of hydroxy benzene employed is 1200 grams, the quantity of boron trifluoride-hydroxy benzene complex is 60 grams and the entire cashew nut shell liquid charge is replaced by 300 grams of vacuum distilled cardanol. The resultant reaction mass, after neutralization, removal of salts and excess phenol, is a heavy viscous liquid hereinafter known as product II. Product II is dissolved in one liter of toluene and filtered through a bed of Celite (diatomaceous earth) on a Buchner funnel. The toluene was removed in vacuo leaving behind an amber-colored viscous pourable product II.

103 grams of viscous amber-colored product II is dissolved in 200 grams of methylisobutyl ketone in a 2-liter, 3-neck flask. While being constantly stirred, there was added to said solution, in dropwise fashion, 24 grams of sodium hydroxide dissolved in water. The temperature of the mass was raised to 75° C. After the last addition of the sodium hydroxide solution and then while being constantly stirred, 51 grams of epichlorhydrin was slowly added thereto in dropwise fashion. Throughout the entire course of the epichlorhydrin addition which took approximately ½ hour, the temperature of the mass was controlled and maintained in the range of 75-85° C. After the last increment of epichlorhydrin was added, the temperature of the mass was maintained within said temperature range for an additional 90 minutes for complete reaction and high yield purpose. Then the mass was neutralized with .08 moles of dilute hydrochloric acid in 48 grams of water subsequently removed by boiling, using a Dean and Stark water separator arrangement. Then an additional 100 grams of methyl isobutyl ketone was added to the mass and after cooling to 60° C. the solution was filtered through a ½ inch bed of Celite (diatomaceous earth) filter aid on filter paper using a Buchner funnel. A clear amber-colored filtrate solution was obtained and transferred to a distillation flask and the solvent removed in vacuo. The resultant mass, product IIE, weighed 103.5 grams, had a viscosity of 3.6 cm. at 130° F. on the Fluidmeter and an epoxy value equal to 0.97 equivalent per 100 grams as shown by the Gibbs test for free phenolic groups. A portion of the resin IIE was cured at 340° F. After 5 hours at that temperature, it was converted to a rubbery mass which when compared with the resin of Example A after 5 hours at 340° C. did not exhibit the toughness characteristic of the solid resin of Example A, which at the end of that period was hard and tough. After being maintained for 17 hours at 340° F. the resin of this example was found to be a rubbery solid. A portion of the resin, product IIE, was cured by adding 5 parts of triethylene tetramine to 100 parts thereof, and this mixture was maintained at 240° F. for 1 hour. At the end of that period it was a solid resilient infusible mass. After 2 hours at that temperature it was harder, tougher and less pliable.

*Example C*

Using 100 grams of a bis-phenol of the following structure:

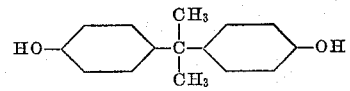

in place of product I in Example A and following the procedure set forth in Example A, there is produced a product known as product IIIE.

*Example D*

Using 70 grams of a bis-phenol of the following structure:

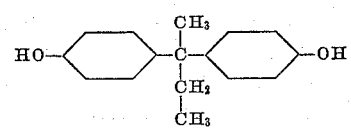

in place of product II in Example B and following the procedure set forth in Example B, there is produced a product known as product IVE.

*Mixture P*

60 grams of material FKI of Example 1 above, 40 grams of product IE of Example A above and 5 grams of triethylene tetramine were thoroughly mixed together. This mixture has a pot life of 3 to 5 hours at room temperature. This mixture can be applied as an impregnation or coating or as both, for example, on glass filaments or on matted or woven fabrics made of glass filaments. Tubing or pipe made from woven glass fabric and impregnated with this material and cured at up to 280° F. for from 2 to 12 hours was strong and tough and was capable of holding a hydraulic pressure of up to 3500 lbs. per. sq. in., the dimension of the pipe being 4 inches in diameter and ⅛ inch wall.

*Mixture Q*

A thorough mixture was made of:

90 parts by weight of product IIE of Example B
10 parts by weight of product FK2 of Example 2
5 parts by weight of diethylene triamine, and
30 parts by weight of methylethyl ketone
the latter as a solvent or thinner.

This mixture can be sprayed on metal, wood, concrete or other surface and allowed to air cure for 2 to 3 days whereupon there is formed a tough adhesive coating having good water and chemical resistance.

*Mixture R*

A thorough mixture was made of:

50 parts by weight of product IIIE of Example C
50 parts by weight of product FK9 of Example 9, and
7½ parts by weight of triethylene tetramine This mixture can be poured into a container holding an electrical coil or a transformer and allowed to set over night at room temperature upon which the mixture will set to a tough, homogenous mass of good electrical insulating characteristics having resistance to oil, water and acids and forming a strong impregnation and covering in and over the coil or transformer.

Although the above mixtures P to R cite certain ratios of glycidyl ethers of bis-phenols (called epoxy resins below) furfural-ketone reaction products (called FK products below) we have found that the ratios generally can be varied from 90 parts of the former to 10 parts of the latter to 10 parts of the former to 90 parts of the latter, to suit different uses and conditions of application. And in varying these ratios it is generally the case that when amines are used for catalyzing the copolymerization of these two materials, then the greater the amount of furfural ketone reaction product used the higher the alkalinity of the amine used.

*Mixture S*

A thorough mixture was made of:

75 parts by weight of product IIIE of Example C
25 parts by weight of product FK1 of Example 1, and
33 parts by weight of phthalic anhydride and a mixture was poured into a mold and cured at 200–300° F. for 24 hours. The cured cast piece was cut into sections which were useful as electrical insulators.

Referring to mixture S, the relative influence of phthalic anhydride on epoxy resins, on furfural ketone products and on various mixtures thereof, when heated for 24 hours at 300° F. is noted in the table below, the measure of the influence being the consistency of the final product as noted, the figures indicating parts by weight (PA indicates phthalic anhydride):

100 FK, 33 PA _____ Soft at room temperature.
75 FK, 25 epoxy, 33 PA ___ Soft at 300° F.
50 FK, 50 epoxy, 33 PA ____ Hard (and the hardest) at 300° F.
25 FK, 75 epoxy, 33 PA ____ Hard at 300° F.
100 epoxy, 33 PA _____ Soft at 300° F.

*Example T*

90 parts by weight of a glycidyl polyether of glycerine having an epoxide equivalent of 140–165 grams was mixed with 10 parts by weight of material FK1 and then there was admixed therewith 20 parts by weight of triethylene tetramine and this mix was poured into a container in which was located an electrical component. Then the container together with said mix and the component were placed in an oven maintained at 300° F. and allowed to remain for 16 hours. At the end of that period, said mix will be found to have been converted to the solid state.

*Examples U–V*

Employ the same procedure and components as set forth in Example T except that for the 90 parts by weight of the glycidyl polyether of glycerine, 90 parts by weight of the following were respectively substituted: liquid polyether of resorcinol having an epoxide equivalent of 160–180 grams and liquid "bis-phenol A" (2,2-bis(para-hydroxy phenyl) propane) glycidyl polyether having an epoxide equivalent of 190–210.

*Example W–X*

Employ the same procedure and components as set forth in Examples T–V, except that for the 10 parts by weight of material FK1, 10 parts by weight of the following were respectively substituted: Fraction II (difurfural acetone) of Example 1 of U. S. Patent 2,600,403, product B-14, having viscosity of 5000 centipoises at 25° C. (homopolymerized acetone-furfural reaction product) of U. S. Patent 2,803,618 and fraction I (monofurfural acetone) of Example 1 of U. S. Patent 2,600,403.

*Examples AA–FF*

Employ the same procedure and components as set forth in Examples T–X, except that for the 20 parts by weight of triethylene tetramine, there was substituted 20 parts by weight of phthalic anhydride.

All of the novel products produced in accordance with the Examples T–CC were found to be solid at the end of said 16 hour period.

In addition to the patent literature cited above, the following are cited as showing materials suitable for making bis-phenols; U. S. Patent Nos. 2,098,824, 2,176,059 and 2,317,607.

In addition to the amines and the phthalic anhydride recited above, other coupling agents suitable for effecting a reaction between materials A and materials B are as follows: oxalic, succinic, adipic, azelaic, sebacic, maleic and phthalic acid and their anhydrides and also, for examples, alkaline salts of phenols such as the sodium and potassium salts of cardanol and of cashew nut shell liquid and sodium and potassium phenolates and their homologs.

Materials B are generally of considerable viscosity. Some of the materials A are of low viscosity and may be mixed with materials B to produce relatively low viscosity combinations which are easy to handle and to apply in their use. The various combinations of materials A and B are generally insert and unreactive by themselves at atmospheric temperatures. Such combinations may, when combined with certain coupling agents or catalysts, be thickened at temperatures ranging from room temperature up to temperatures of 300° F.

In general the ratio by weight of material A to material B employed in the novel combinations of this invention comprise 95–5 parts of material A to 5–95 parts of material B. When amine is employed as the coupling agent, it is preferable that those of higher alkalinity be used, when the amount of material A exceeds that of material B. Also, the amine employed may be any amine equivalent to those cited above as examples and include generally the primary, secondary, tertiary and/or quaternary amines.

In one of its specific aspects it is preferable to employ for certain purposes such combinations of materials A and materials B, which are characterized as follows: a 100 gram sample of such combination when intimately mixed with 20 grams of diethylene triamine, such mixture when placed and maintained for a period of 24 hours in an oven maintained at 300° F., at the end of that period, the mass will be found to be heat hard, that is, at 300° F. it will be solid.

It is also to be understood that the following claims are intended to cover all the generic and specific features of the invention herein described, and all statements of the scope of the invention, which as a matter of language might be said to fall therebetween.

It is to be understood that the following claims are intended to cover all the generic and specific features of the invention herein described and all statements of the scope of the invention which as a matter of language might be said to fall therebetween, and that they are intended to be inclusive in scope and not exclusive in that, if desired, other materials may be added to our novel composition of matter herein claimed without departing from the spirit of the invention. Particularly it is to be understood that in said claims ingredients or components recited in the singular are intended to include compatible mixtures of said ingredients wherever the sense permits.

This application is a continuation-in-part of our copending application 379,068, filed September 8, 1953, now abandoned.

We claim:

1. A composition of matter obtained by making a mixture of material B liquid at 300° F. and selected from the group consisting of monomeric and polymeric glycidyl ethers of polyhydric phenols and aliphatic polyhydric alcohols and material A liquid at 300° F. and selected from the group consisting of (a) furfural-ketone organic reaction products and (b) homopolymers of (a) and subjecting said mixture to the action of an amine.

2. A composition of matter obtained by making a mixture of material B liquid at 300° F. and selected from the group consisting of monomeric and polymeric glycidyl ethers, of polyhydric phenols and aliphatic polyhydric alcohols and material A liquid at 300° F. and selected from the group consisting of (a) furfural-ketone organic reaction products and (b) homopolymers of (a) and subjecting said mixture to the action of a strongly alkaline amine.

3. The reaction product of a glycidyl ether of a bis-phenol, a furfural-ketone reaction product and an amine.

4. The reaction product of a glycidyl ether of a bis-phenol, homopolymer of furfural-ketone reaction product, and an amine, said homopolymer being liquid at 300° F.

5. The reaction product of a glycidyl ether of a bis-phenol, a reaction product of furfuraldehyde and a ketone and a secondary amine.

6. The reaction product of a glycidyl ether of a bis-phenol, a reaction product of furfuraldehyde and a ketone, and a primary amine.

7. A composition of matter obtained by subjecting a combination of material A liquid at 300° F. and selected from the group consisting of (a) furfural-ketone organic reaction products and (b) homopolymers of (a) and material B liquid at 300° F. and selected from the group consisting of monomeric and polymeric glycidyl ethers of polyhydric phenols and aliphatic polyhydric alcohols to the influence of a coupling agent selected from the group consisting of amines and organic dibasic carboxylic acids.

8. A composition of matter obtained by making a mixture of material A liquid at 300° F. and selected from the group consisting of (a) furfural-ketone organic reaction products and (b) homopolymers of (a) and material B liquid at 300° F. and selected from the group consisting of monomeric and polymeric glycidyl ethers of polyhydric phenols and aliphatic polyhydric alcohols and subjecting said mixture to the action of a coupling agent selected from the group consitsing of amines and organic dibasic carboxylic acids.

9. A composition of matter obtained by subjecting a mixture of a glycidyl ether of a bis phenol and a reaction product of furfuraldehyde and a ketone to the influence of a coupling agent selected from the group consisting of amines and organic dibasic carboxylic acids.

10. A composition of matter obtained by making a mixture of (I) a glycidyl ether of a bis-phenol and (II) a product of the reaction of furfuraldehyde and a ketone under alkaline conditions, and subjecting said mixture to the action of a coupling agent selected from the group consisting of amines and organic dibasic carboxylic acids.

11. Material A liquid at 300° F. and selected from the group consisting of (a) furfural-ketone organic reaction products and (b) homopolymers of (a) intimately combined with material B liquid at 300° F. and selected from the group consisting of monomeric and polymeric glycidyl ethers of polyhydric phenols and aliphatic polyhydric alcohols, said combination characterized as follows: when a mixture consisting of a 100 gram sample thereof mixed with 20 grams of diethylene triamine, and placed and allowed to remain for a period of 24 hours in an oven maintained at 300° F., at the end of that period the mass will be solid at that temperature.

12. A mixture of a glycidyl ether of a bis phenol and a reaction product of furfuraldehyde and a ketone, said mixture being capable of being set to a solid state under the influence of an amine.

13. A combination of material A liquid at 300° F. and selected from the group consisting of (a) furfural-ketone organic reaction products and (b) homopolymers of (a) and material B liquid at 300° F. and selected from the group consisting of monomeric and polymeric glycidyl ethers of polyhydric phenols and aliphatic polyhydric alcohols, the ratio by weight of material A to material B being 5–95 parts of material A to 95–5 parts of material B.

14. A solution of a viscous material B selected from the group consisting of monomeric and polymeric glycidyl ethers of phenols and aliphatic polyhydric alcohols and a thinner therefor, said thinner comprising material B which is liquid and is a furfural-ketone organic reaction product, said solution being stable at normal atmospheric temperature and pressure conditions and further characterized as follows: when a mixture consisting of a 100 gram sample thereof, mixed with 20 grams of diethylene triamine, and placed and allowed to remain for a period of 24 hours in an oven maintained at 300° F., at the end of that period the mass will be solid at that temperature.

References Cited in the file of this patent

UNITED STATES PATENTS

| | | |
|---|---|---|
| 2,461,510 | Harvey | Feb. 15, 1949 |
| 2,506,486 | Bender et al. | May 2, 1950 |